2,839,357
SOLVENT EXTRACTION PROCESS FOR URANIUM RECOVERY

Herbert M. Clark, Troy, N. Y., and Dick Duffey, La Fontaine, Ind., assignors to the United States of America as represented by the United States Atomic Energy Commission No Drawing. Application February 7, 1949
Serial No. 75,065

16 Claims. (Cl. 23—14.5)

This invention relates to the recovery of uranium values from uranium-containing ores, and especially relates to the recovery of uranium values substantially free of molybdenum contamination.

In some of the uranium-containing ores, for example, pitchblende, uranium values are associated with compounds of other metals. A typical analysis of pitchblende ore is as follows:

|  | Percent |
|---|---|
| $U_3O_8$ | 50–65 |
| $SiO_2$ | 16–21 |
| PbO | 5–6.5 |
| $Fe_2O_3$ | 0.25–0.50 |
| $MoO_3$ | 0.5–0.8 |
| NiO | 0.5–2.2 |
| $Al_2O_3$ | About 0.6 |
| CaO | 0.4–1.0 |
| MgO | About 2.2 |
| CuO | 0.10–0.35 |
| Co | About 0.17 |
| $MnO_2$ | 0.02–0.05 |
| $V_2O_3$ | About 0.06 |
| $TiO_2$ | About 0.06 |
| BaO | About 0.06 |
| Rare earths | About 0.16 |
| $CO_2$ | About 1.5 |
| $SO_3$ | About 0.45 |
| $P_2O_5$ | About 1.11 |

In the recovery of uranium values from such ores by digestion with nitric acid there is usually obtained a uranyl nitrate solution containing at least 0.5 M free nitric acid and heteropoly acids of molybdenum, for example, a phosphomolybdic acid and a silicomolybdic acid. In the purification and recovery of uranium from said aqueous solution by solvent extraction with subsequent re-extraction using water, a substantial amount of the molybdenum content is also extracted by the organic solvent and re-extracted by water. As a result, the molybdenum content of uranium prepared from the re-extracted uranyl nitrate is too high for some uses of uranium.

It is an object of this invention to provide a process for the recovery of uranium values substantially free of molybdenum.

It is another object of the present invention to provide a process for the separation of uranyl nitrate from an aqueous solution also containing a heteropoly acid of molybdenum under conditions which will leave a substantial amount of the molybdenum content in the aqueous solution.

Still a further object of this invention is to provide a process for the purification of uranyl nitrate with respect to impurities such as hydrolyzable metal nitrates.

Other objects and advantages will be apparent from the description which follows.

We have discovered that uranium values substantially free of molybdenum contamination can be recovered from an aqueous solution of uranyl nitrate containing at least 0.5 M nitric acid and a heteropoly acid of molybdenum. Examples of the heteropoly acids of molybdenum are phosphomolybdic acid and silicomolybdic acid. The heteropoly acids were found to be extractable by the organic solvents from the acidic aqueous solution especially from solutions containing a salting-out agent. It was found that the extraction of these acids could be substantially reduced by reducing the free acidity of the aqueous solution prior to contacting with an organic solvent for substantial extraction of the uranyl nitrate content.

The process of this invention comprises neutralizing at least part of the nitric acid to lower the acid concentration to a value of less than 0.5 M, preferably to a concentration of 0.01 to 0.2 M, incorporating a salting-out agent in the aqueous solution, contacting the resultant aqueous solution with a liquid organic solvent, preferably containing between 0.5 and 1.5 M nitric acid, and separating an aqueous raffinate phase and an organic solvent extract phase.

The concentration of uranyl nitrate may vary within wide limits, but a concentration of uranyl nitrate between 300 and 500 g./liter is preferred. The concentration of the heteropoly acid will vary according to this concentration and the molybdenum values in a particular ore.

Suitable types of liquid organic solvent are: ethers, glycol ethers, esters, ketones, alcohols, alkyl phosphates, nitrohydrocarbons, and alkyl sulfides. A common structural property of all of these types of compounds is that they have an atom capable of donating an electron pair to a coordination bond. The extractive solvent is a liquid substantially immiscible with water and aqueous solutions. If it is a solid at room temperature, the extraction is carried out at a temperature above its melting point. Specific examples of suitable organic solvents for the use in this invention are as follows:

Diethyl ether
Diisopropyl ether
Butoxyethoxyethane (ethyl butyl "Cellosolve")
Dibutyl ether of diethylene glycol (dibutyl "Carbitol")
Diethyl ether of ethylene glycol (diethyl "Cellosolve")
Dibutyl ether of tetraethylene glycol
Ethyl acetate
n-Propyl acetate
Butoxyethoxyethyl acetate (butyl "Carbitol" acetate)
Methyl isobutyl ketone (hexone)
Acetophenone
Mesityl oxide
Cyclohexanone
Tert-amyl alcohol
2-ethyl-1-hexanol
Tributyl phosphate
Trioctyl phosphate
Dioctyl hydrogen phosphate
Octadecyl dihydrogen phosphate
Nitromethane
Ethyl sulfide
n-Propyl sulfide Of course, mixtures of the foregoing solvents may be used in carrying out the process of the present invention.

The salting-out agent may be incorporated in the aqueous solution prior to or after the neutralization of at least part of the free nitric acid. Water-soluble inorganic salts may be used as the salting-out agent and the following metal nitrates are preferred: $NaNO_3$, $Ca(NO_3)_2$, KNO$_3$, Sr(NO$_3$)$_2$, Ba(NO$_3$)$_2$, LiNO$_3$, Mg(NO$_3$)$_2$, NH$_4$NO$_3$, La(NO$_3$)$_3$, Mn(NO$_3$)$_2$, Al(NO$_3$)$_3$. The molar concentration of the salting-out agent will vary depending upon the valence of the cation and the concentration of the anion desired. In general, the salting-out agent concentration will be between 2 and 6 M, and, of course, mixtures of salting-out agents, for example, a mixture of sodium nitrate and calcium nitrate may be used. Furthermore, the neutralization of at least part of the nitric acid provides at least part of the salting-out agent. In other words, the neutralization of free acid will serve as a simultaneous incorporation of at least part of the salting-out agent.

The neutralization of nitric acid can be accomplished by the addition of oxides, hydroxides and carbonates of alkali metals and alkaline earth metals. Of course, other salts of these metals and weak acids may be used.

In an embodiment of the invention, the process is carried out as described above.

In a second embodiment, the steps of the first embodiment are carried out, and the organic solvent extract phase is contacted with water and an aqueous extract phase and an organic solvent phase are separated. By this embodiment purified uranyl nitrate is recovered as an aqueous solution.

In another embodiment of the present invention, a uranyl nitrate solution containing at least 0.5 M nitric acid and a heteropoly acid of molybdenum may be contacted after addition of salting-out agent with a liquid organic solvent containing 0.5 to 1.5 M nitric acid. The aqueous raffinate phase and organic solvent extract phase are separated, and the extract phase is contacted with water. An aqueous extract phase containing uranyl nitrate and an organic solvent phase are separated. Nitric acid is partially extracted by the organic solvent and the water partially re-extracts it. The nitric acid concentration of the aqueous extract phase is reduced by neutralization to a value of less than 0.5 M, a salting-out agent is incorporated, and uranyl nitrate is extracted therefrom by solvent extraction. The solvent preferably contains 0.5 to 1.5 M nitric acid. This embodiment is especially useful when the original uranyl nitrate solution contains a heteropoly acid of molybdenum and hydrolyzable metal nitrates, such as iron and aluminum nitrates, which would precipitate upon reduction of the nitric acid concentration. By using this embodiment, uranyl nitrate and only part of the molybdenum content is separated from the original aqueous solution, leaving behind the metals, such as iron and aluminum, which would precipitate as basic nitrates or hydroxides if the acidity had been substantially reduced. The extracted uranyl nitrate is re-extracted by water and the acidity of this uranyl nitrate solution is reduced by neutralization to a concentration of less than 0.5 M nitric acid. The uranyl nitrate is then solvent extracted using an organic solvent preferably containing 0.5 to 1.5 M nitric acid without substantial extraction of a heteropoly acid of molybdenum.

In the solvent extraction of an aqueous solution of uranyl nitrate containing hydrolyzable metal nitrates, it was found that in a continuous countercurrent extraction system the hydrolyzable nitrates would be converted to relatively insoluble compounds when the acidity of the aqueous solution was lowered to prevent extraction of a heteropoly acid of molybdenum. Such precipitates of the hydrolyzable products cause emulsions in the continuous extraction column and cause clogging in a packed column. By the use of the third embodiment of this invention it is possible to separate such hydrolyzable metal nitrates before solvent extraction of uranyl nitrate under conditions wherein a heteropoly acid of molybdenum is not extracted. Since molybdenum valves have a slow tendency to precipitate from solutions containing very low acid concentrations, it is preferred to carry out the solvent extraction in all embodiments from solutions containing less than 0.5 M nitric acid within a short time after the reduction of the acidity and to use an organic solvent containing 0.5 to 1.5 M nitric acid.

The following examples will illustrate the process of the present invention.

EXAMPLE I

A series of aqueous solutions each containing 1 g./liter of silicomolybdic acid was shaken with equal volumes of diethyl ether. One aqueous solution contained only silicomolybdic acid. Another solution also contained 450 g./liter of uranyl nitrate. All of the other solutions contained nitric acid, calcium nitrate, sodium nitrate, or mixtures thereof. This series of tests served to show in a qualitative way the effect of nitric acid upon the distribution of this heteropoly acid of molybdenum between an aqueous solution and diethyl ether. Using the aqueous solution containing only silicomolybdic acid, none of this acid was extracted. In the case of the solution containing 1.6 M nitric acid a faint trace of the silicomolybdic acid appeared in the ether. All of the silicomolybdic acid appeared to be extracted by the ether from the aqueous solution containing 4 M nitric acid. Using the aqueous solutions containing 0.6 M calcium nitrate and 0.8 M sodium nitrate, respectively, none of the silicomolybdic acid was extracted. However, all of the silicomolybdic acid was extracted by the ether, when aqueous solutions each containing 0.6 M calcium nitrate and containing 1.6 and 4 M nitric acid, respectively, were used. Using 0.6 M calcium nitrate solution of silicomolybdic acid containing 0.16 M nitric acid about one-half of the silicomolybdic acid was extracted by the ether. Using 0.8 M sodium nitrate solution of silicomolybdic acid containing 0.16 M nitric acid, only one part in eleven parts of the silicomolybdic acid was extracted by the ether. None of the silicomolybdic acid was extracted from the aqueous solution containing uranyl nitrate. These results show that a high concentration of nitric acid favors the ether extraction of the heteropoly acid of molybdenum. The substantial lack of extraction of the silicomolybdic acid from the 1.6 M nitric acid solution was due to the absence of a salting-out agent, since the presence of 0.6 M calcium nitrate resulted in substantially complete extraction of silicomolybdic acid.

EXAMPLE II

A series of countercurrent column extraction runs was carried out using aqueous solutions of uranyl nitrate obtained by nitric acid digestions of pitchblende ore.

In two of these runs the countercurrent extraction column consisted of a sieve-plate extractor in which there were twenty-six plates each with 0.1" diameter hole and a 0.15" inside diameter downpipe. The distance between the plates was 6.5". The inside diameter of the column was 1" and the inside volume of the column was 2.85 liters. The disengaging volume above the top interface was 0.55 liter. In the rest of the runs a packed extractor was used. It was prepared by removing the plates of a sieve-plate extractor and filling the sections with Raschig rings. The resulting column had eighteen packed sections each of 1" inside diameter and approximately 6" long. The Raschig rings were made by cutting glass tubing 6 mm. outside diameter and 4 mm. inside diameter into 6 mm. lengths. The necessary centrifugal pumps, rotameter, pipes, valves, etc., were used. In all of the runs diethyl ether was used as the organic solvent extractant. In most of the runs the aqueous solution was the dispersed phase and ether was the continuous phase. The flow rates of the aqueous solution and diethyl ether were adjusted to provide an ether to aqueous solution ratio of 2 to 1. The aqueous solution feed rate varied from 70 cc./min. in run No. 1 to 15 cc./min. in run No. 9.

The compositions of the feed solutions are indicated below in Table I.

*Table I*

COMPOSITIONS OF FEED SOLUTIONS

| Run No. | Uranyl nitrate, g./l. | $HNO_3$, M | $NaNO_3$, M | $Ca(NO_3)_2$, M | $MoO_3$, g./l. | $SiO_2$, g./l. | $P_2O_5$, g./l. | Specific gravity |
|---|---|---|---|---|---|---|---|---|
| 1 | 429 | 0.78 | 3.4 | | 1.08 | | 0.39 | 1.652 |
| 2 | 457 | 0.76 | 2.5 | | 1.83 | 0.14 | 0.375 | 1.609 |
| 3 | 396 | 0.40 | 3.2 | | 0.99 | 0.044 | 0.102 | 1.580 |
| 4 | 506 | 0.15 | 2.9 | | 0.45 | 0.138 | 0.41 | 1.648 |
| 5 | 352 | 0.096 | 3.5 | | 1.29 | 0.122 | 0.043 | 1.561 |
| 6 | 238 | 0.02 | 4.5 | | 0.026 | 0.14 | 0.025 | 1.512 |
| 7 | 323 | <0.02 | 2.6 | 2.0 | 1.20 | 0.424 | 0.042 | 1.558 |
| 8 | 490 | 0.01 | 3.3 | | 0.45 | 0.088 | 0.28 | 1.615 |
| 9 | 352 | 0.096 | 3.5 | | 1.29 | 0.122 | 0.043 | 1.561 |
| 10 | 323 | <0.02 | 2.6 | 2.0 | 1.20 | 0.424 | 0.042 | 1.558 |
| 11 | 370 | 0.98 | 2.4 | | 1.325 | 0.13 | 0.043 | 1.551 |
| 12 | 352 | 0.096 | 3.5 | | 1.29 | 0.122 | 0.043 | 1.561 |
| 13 | 323 | <0.02 | 2.6 | 2.0 | 1.20 | 0.424 | 0.042 | 1.558 |

It will be noted that the feed solutions used in the numbered runs 5, 9, and 12 had the same composition and the runs feed solutions used in the numbered 7, 10, and 13 had the same composition.

The feed solution used in run No. 1 was prepared by slurrying 10 kg. of 100-mesh pitchblende ore containing 67.5% $U_3O_8$ with 6.5 l. of water. Then 6.9 l. of 42° Baumé nitric acid was added and the ore was digested in this mixture for five hours at 85–100° C. The amount of nitric acid was 1.8 times the stoichiometric amount required to dissolve uranium values. The undissolved material was separated by filtration and washed with 6 l. of hot water. The filtrate and washing were combined and concentrated to provide a volume of 16.1 l. and 4.5 kg. of sodium nitrate was added to provide the feed solution.

The feed solution for run No. 11 was prepared by making a slurry of 60 kg. of 100-mesh pitchblende ore containing 61.9% $U_3O_8$, 26.5 lbs. of sodium nitrate and 10.7 gal. of water. A 14.65-gal. quantity of 36° Baumé nitric acid was added to the slurry at a maximum rate of 44 gals./hr. This amount of nitric acid is twice the stoichiometric amount. The mixture was digested for three hours at 95–100° C. and then filtered. The lead dissolved by the digestion and present in the filtrate was precipitated by the addition of 1.32 gal. of 66° Baumé sulfuric acid. The precipitate was removed by filtration and sulfate was removed by adding 32 lbs. of barium carbonate. The barium sulfate precipitate was removed by filtration and the resultant filtrate was boiled down to a volume of 30.8 gals. Sodium nitrate was added to a 4-gal. quantity of this solution to provide the feed solution. Another four gallons of this solution was treated with sodium carbonate to partially neutralize the free nitric acid and to provide the feed solutions for runs numbered 5, 9 and 12. Calcium oxide was added to a third 4-gal. quantity of the solution to almost completely neutralize the free acidity and the resultant solution was saturated with calcium nitrate to provide the feed solution for runs numbered 7, 10 and 13.

The foregoing descriptions illustrate the type of uranyl nitrate solution obtained by nitric acid digestion of uranium-containing ores and illustrate the manner in which part of free nitric acid is neutralized in carrying out the process of this invention.

The amounts of extraction of heteropoly acids of molybdenum in these runs are indicated below in Table II.

*Table II*

| Run No. | Nitric Acid Concentration, M | | Percent $MoO_3$ in Ether Extract |
|---|---|---|---|
| | Aqueous Feed | Ether | |
| 1 | 0.78 | 1 | 29.6 |
| 2 | 0.76 | 1.03 | 31.7 |
| 3 | 0.40 | 1 | 12.3 |
| 4 | 0.15 | 1.22 | 16.4 |
| 5 | 0.096 | 1 | 9.8 |
| 6 | 0.02 | 1.09 | 7.6 |
| 7 | <0.02 | 1 | 31.0 |
| 8 | 0.01 | 1 | 1.3 |
| 9 | 0.096 | 0.1 | 3.2 |
| 10 | <0.02 | 0.1 | 3.1 |
| 11 | 0.98 | 0 | 9.3 |
| 12 | 0.096 | 0 | 0.1 |
| 13 | <0.02 | 0 | 0.2 |

It is apparent from a study of the data in Table II that the amount of extraction of molybdenum values was substantially reduced by carrying out the process of this invention as compared with the amount of extraction of molybdenum values from aqueous solutions containing at least 0.5 M nitric acid using diethyl ether containing between 0 and about 1.2 M nitric acid. The data in Table II show that a minimum amount of molybdenum was extracted when the aqueous solution contained 0.1 M or less nitric acid and the ether contained either 0.1 M nitric acid or no nitric acid. However, using such solutions in some of the runs there was difficulty with emulsion formation. The runs using ether containing about 1 M nitric acid were quite satisfactory with the formation of either no emulsion or substantially no emulsion. The relatively high amount of molybdenum extraction in run No. 7 was attributed to the high total concentration of salting-out agents, namely, sodium nitrate and calcium nitrate. Although only 2 M calcium nitrate was used with 2.6 M sodium nitrate in this run, the effective concentration on an equivalent sodium nitrate basis would be about 6.6 M sodium nitrate since 2 M calcium nitrate contains twice the nitrate concentration of 2M sodium nitrate.

The foregoing data of extraction of molydenum values were obtained by twice fuming aliquots of the aqueous and ether phases with sulfuric acid. The resultant sulfate solutions were then treated to determine molybdenum content according to the thiocyanate method using amyl acetate as the extractant. The uranyl nitrate extraction data of at least 99% extraction in all cases were obtained by analyses of the feed solutions and aliquots of the sample prepared from the ether phase for the molybdenum determination. In both cases the uranyl salt was reduced and then titrated with ceric sulfate.

As illustrated by Example II well-known extraction procedures and apparatus may be used in the present invention. Thus, the extraction steps may be effected by the use of batch, continuous batch, batch countercurrent, or continuous countercurrent methods. A more efficient extraction is obtainable using the continuous countercurrent method of extraction. In all cases the ratio of liquid organic solvent to initial aqueous solution may vary widely and the optimum ratio will depend upon the particular organic solvent used. Ratios of between 1 and 10 are preferred. The organic solvent may be used as either the dispersed phase or the continuous phase, and the latter use is the preferred mode of operation.

The foregoing illustrations and embodiments of this invention are not intended to limit its scope, which is to be limited entirely by the appended claims.

What is claimed is:

1. A process for the separation of uranyl nitrate from an aqueous solution containing uranyl nitrate and a heteropoly acid of molybdenum, and which is at least 0.5 M in nitric acid, which comprises neutralizing at least part of the nitric acid of said solution to provide an acidity of less than 0.5 M, incorporating a salting-out agent in said solution, contacting the resultant aqueous solution with a liquid organic solvent which is substantially immiscible with said aqueous solution and which contains at least one atom capable of donating an electron pair to a coordination bond, and separating an aqueous raffinate phase and an organic solvent extract phase containing uranyl nitrate and only a minor amount of the molybdenum values.

2. The process of claim 1 wherein the organic solvent is diethyl ether.

3. A process for the separation of uranyl nitrate from an aqueous solution containing uranyl nitrate and a heteropoly acid of molybdenum, and which is at least 0.5 M in nitric acid, which comprises neutralizing at least part of the nitric acid of said solution to provide an acidity of less than 0.5 M, incorporating a salting-out agent in said solution, contacting the resultant aqueous solution with a liquid organic solvent which is substantially immiscible with said aqueous solution and which contains at least one atom capable of donating an electron pair to a coordination bond, said solvent containing between 0.5 and 1.5 M nitric acid, and separating an aqueous raffinate phase and an organic solvent extract phase containing uranyl nitrate and only a minor amount of the molybdenum values.

4. The process of claim 3 wherein the organic solvent is diethyl ether.

5. The process of claim 3 wherein the heteropoly acid is a phosphomolybdic acid, the salting-out agent is sodium nitrate, and the organic solvent is diethyl ether.

6. The process of claim 3 wherein the heteropoly acid is a silicomolybdic acid, the salting-out agent is sodium nitrate, and the organic solvent is diethyl ether.

7. The process of claim 3 wherein the heteropoly acid is a phosphomolybdic acid, the salting-out agent is calcium nitrate, and the organic solvent is diethyl ether.

8. The process of claim 3 wherein the heteropoly acid is a silicomolybdic acid, the salting-out agent is calcium nitrate, and the organic solvent is diethyl ether.

9. A process for the separation of uranyl nitrate from an aqueous solution containing uranyl nitrate and a heteropoly acid of molybdenum, and which is at least 0.5 M in nitric acid, which comprises neutralizing at least part of the nitric acid of said solution to provide an acidity of 0.01 to 0.2 M, incorporating a salting-out agent in said solution, contacting the resultant aqueous solution with diethyl ether containing 0.5 to 1.5 M nitric acid, and separating an aqueous raffinate phase and an ether extract phase containing uranyl nitrate and containing only a minor amount of the molybdenum values.

10. A process for the purification of uranyl nitrate, which comprises adding a neutralizing agent to an aqueous solution containing uranyl nitrate and a heteropoly acid of molybdenum, and which is at least 0.5 M in nitric acid, said neutralizing agent being added in amount sufficient to reduce the nitric acid concentration to a value of less than 0.5 M, incorporating a salting-out agent in said solution, contacting the resultant aqueous solution with a liquid organic solvent which is substantially immiscible with said aqueous solution and which contains at least one atom capable of donating an electron pair to a coordination bond, separating an aqueous raffinate phase and an organic solvent extract phase, contacting said organic solvent extract phase with water, and separating an organic solvent phase and an aqueous extract phase containing uranyl nitrate and only a minor amount of the molybdenum values.

11. The process of claim 10 wherein the organic solvent is diethyl ether.

12. The process of claim 11 wherein diethyl ether contains between 0.5 and 1.5 M nitric acid.

13. A process for the purification of uranyl nitrate, which comprises adding a salting-out agent to an aqueous solution containing uranyl nitrate, a heteropoly acid of molybdenum, and a hydrolyzable metal nitrate, and which is at least 0.5 M in nitric acid, contacting the resultant aqueous solution with a liquid organic solvent which is substantially immiscible with said aqueous solution and which contains at least one atom capable of donating an electron pair to a coordination bond, said solvent containing between 0.5 and 1.5 M nitric acid, separating an aqueous raffinate phase and an organic solvent extract phase, contacting said organic solvent extract phase with water, separating an organic solvent phase and an aqueous extract phase, neutralizing at least part of the nitric acid in the aqueous extract phase to provide an acidity of less than 0.5 M, incorporating a salting-out agent in said aqueous extract phase, contacting the resultant aqueous solution with a liquid organic solvent which is substantially immiscible with the aqueous solution and which contains at least one atom capable of donating an electron pair to a coordination bond, and separating an aqueous raffinate phase and an organic solvent extract phase containing purified uranyl nitrate.

14. A process for the purification of uranyl nitrate, which comprises adding a salting-out agent to an aqueous solution containing uranyl nitrate, a heteropoly acid of molybdenum, and a hydrolyzable metal nitrate, and which is at least 0.5 M in nitric acid, contacting the resultant aqueous solution with diethyl ether containing between 0.5 and 1.5 M nitric acid, separating an aqueous raffinate phase and an ether extract phase, contacting said ether extract phase with water, separating an ether phase and an aqueous extract phase, neutralizing at least part of the nitric acid in the aqueous extract phase to provide an acidity of less than 0.5 M, incorporating a salting-out agent in said aqueous extract phase, contacting the resultant aqueous solution with diethyl ether, and separating an aqueous raffinate phase and an ether extract phase containing purified uranyl nitrate.

15. A process for the purification of uranyl nitrate, which comprises adding a salting-out agent to an aqueous solution containing uranyl nitrate, a heteropoly acid of molybdenum, and a hydrolyzable metal nitrate, and which is at least 0.5 M in nitric acid, contacting the resultant aqueous solution with diethyl ether containing between 0.5 and 1.5 M nitric acid, separating an aqueous raffinate phase and an ether extract phase, contacting said ether extract phase with water, separating an ether phase and an aqueous extract phase, neutralizing at least part of the nitric acid in the aqueous extract phase to provide an acidity of less than 0.5 M, incorporating a salting-out agent in said aqueous extract phase, contacting the resultant aqueous solution with diethyl ether containing between 0.5 and 1.5 M nitric acid, and separating an aqueous raffinate phase and an ether extract phase containing purified uranyl nitrate.

16. A process for the separation of uranyl nitrate from an aqueous solution containing uranyl nitrate and a heteropoly acid of molybdenum, and which is at least 0.5 M in nitric acid, which comprises reducing the nitric acid concentration of said solution to provide an acidity of less than 0.5 M, incorporating a salting-out agent in said solution, contacting the resultant aqueous solution with a liquid organic solvent which is substantially immiscible with said aqueous solution and which contains at least one atom capable of donating an electron pair to a coordination bond, and separating an aqueous raffinate phase and an organic solvent extract phase containing uranyl nitrate and only a minor amount of the molybdenum values.

No references cited.